(12) United States Patent
Sasaki et al.

(10) Patent No.: US 7,159,322 B2
(45) Date of Patent: Jan. 9, 2007

(54) POWER WORKING MACHINE

(75) Inventors: Hideshi Sasaki, Wako (JP); Kenjiro Hiratsuna, Wako (JP); Hiroaki Uchitani, Wako (JP)

(73) Assignee: Honda Motor Co., Ltd. (JP)

( * ) Notice: Subject to any disclaimer, the term of this patent is extended or adjusted under 35 U.S.C. 154(b) by 80 days.

(21) Appl. No.: 10/980,523

(22) Filed: Nov. 3, 2004

(65) Prior Publication Data
US 2005/0115079 A1    Jun. 2, 2005

(51) Int. Cl.
*B26B 19/02* (2006.01)
*B27B 17/00* (2006.01)

(52) U.S. Cl. .............................. 30/216; 30/382; 30/210; 16/110.1; 16/426

(58) Field of Classification Search .................. 30/216, 30/382, 383, 381, 210; 16/110.1, 426, 900
See application file for complete search history.

(56) References Cited

U.S. PATENT DOCUMENTS 5,065,476 A    11/1991  Dohse et al. .................. 16/114
6,108,867 A *   8/2000  Nagashima ................ 16/110.1

FOREIGN PATENT DOCUMENTS

| JP | 29097024 | 5/1991 |
|----|----------|--------|
| JP | 11028683 | 2/1999 |

* cited by examiner

*Primary Examiner*—Hwei-Siu Payer
(74) *Attorney, Agent, or Firm*—Adams & Wilks

(57) ABSTRACT

A power working machine has a machine body, trimming blades attached to the machine body and drivable by a drive source, an operating handle rotatably mounted on the machine body, a throttle lever disposed on the operating handle, and a throttle lock lever disposed on the operating handle for disabling pivotal movement of the throttle lever. The operating handle has a lock mechanism for locking the operating handle at a rotational position relative to the machine body, and an operation lever for unlocking the lock mechanism to thereby permit rotational movement of the operating handle and, simultaneously with the unlocking of the lock mechanism, for placing the throttle lock lever in a locking position to disable pivotal movement of the throttle lever. The throttle lock lever has a lock portion for permitting pivotal movement of the throttle lever while simultaneously locking the operation lever of the operating handle.

17 Claims, 17 Drawing Sheets

POWER WORKING MACHINE

FIELD OF THE INVENTION

The present invention relates to a power working machine which can trim an upper surface, side surface, etc. of a hedge with an enhanced workability by allowing a human operator to rotate its operating handle in accordance with desired trimming positions.

BACKGROUND OF THE INVENTION

Examples of power working machines in practical use today include those in which an operating handle is rotatably mounted on a machine body, a throttle lever is mounted on the operating handle for adjustment of an output from a drive source, such as an engine, and a throttle lock lever is also mounted on the operating handle for locking the throttle lever. For practical use, it is only necessary that the power working machines include, in addition to the throttle lever and throttle lock lever, a lock mechanism provided on the machine body for locking the operating handle at a desired rotational angle relative to the machine body and an operation lever (lock-canceling lever) for canceling the locking, by the lock mechanism, of the operating handle. One example of the conventional power working machines is known from Japanese Patent Laid-Open Publication No. HEI-11-28683, which includes the lock mechanism operating in response to human operator's manipulation of a throttle wire.

FIG. 18 hereof illustrates a fundamental construction of the conventionally-known power working machine. The power working machine 200 has a handle structure which includes: an operating handle 202 rotatably mounted on the machine body 201, a throttle lever 203 pivotally attached to the operating handle 202; a throttle lock lever 204 for locking the throttle lever 203; and a lock member 205 that is caused to project, in response to actuation of the throttle lever 203, into abutment against the machine body 201 to thereby stop rotation of the operating handle 202. Namely, a user or human operator can lock the operating handle 202 against the machine body 201 by first disengaging the throttle lock lever 204 from the throttle lever 203 as depicted by arrow b1 and then gripping the throttle lever 203 as depicted by arrow b2 to cause the lock member 205 to project as depicted by arrow b3.

However, with the power working machine 200, the human operator's rotating and locking operation of the operating handle 202 is very cumbersome and complicated because the human operator has to first rotate the handle 202 through a desired rotational angle relative to the machine body 201, disengage the throttle lock lever 204 from the throttle lever 203 and then grip the throttle lever 203 to thereby press the lock member 205 against the machine body 201 so as to lock the handle 202. Further, because the power working machine 200 is not constructed to allow the human operator to lock the handle 202 at a desired position simultaneously with the disengagement of the throttle lock lever 204 from the throttle lever 203, the machine 200 lacks operational reliability in that trimming blades (not shown) are sometimes undesirably activated prior to the locking, against the machine body 201, of the handle 202 depending, for example, on connection timing of a centrifugal clutch.

Therefore, there has been a demand for a power working machine which allows the human operator to rotate the operating handle with simple operation and which can reliably prevent human operator's erroneous operation, e.g. by disabling human operator's operation of the throttle lever during rotating operation of the handle and disabling rotating operation of the handle during operation of the throttle lever.

Another example of the conventional power working machines is known from Japanese Patent No. 2997024, which is constructed to prevent cancellation of the locking by the lock mechanism when the human operator has pulled throttle lever. FIG. 19 hereof is a view showing a fundamental construction of the conventionally-known power working machine 300. The power working machine 300 includes: an operating handle 302 rotatably mounted on the machine body 301, a throttle lever 303 pivotably attached to the operating handle 302; a throttle lock lever 304 for locking the throttle lever 303; and an operation lever 305 for locking/unlocking the operating handle 302 with respect to the machine body 301 that is caused to project, in response to actuation of the throttle lever 303. When the human operator disengages the throttle lock lever 304 from the throttle lever 301 and then pulls the throttle lever 301, a distal end portion 306 of the throttle lever 303 prevents the operation lever 305 from being operated by the human operator. However, because, in the power working machine 300, the operation lever 305 is located only within a finger length from the throttle lever 303, the human operator might accidentally touch and thus erroneously operate the operation lever 305.

Therefore, there has been a demand for a power working machine which can prevent the human operator from accidentally touching the operation lever when operating the throttle lever and thereby allows the human operator to perform the rotating operation of the operating handle with enhanced usability or operability.

SUMMARY OF THE INVENTION

In view of the foregoing prior art problems, it is a first object of the present invention to provide an improved power working machine which allows the human operator to rotate the operating handle as desired with simple operation and which also allows the human operator to operate the throttle lever and operating handle with increased reliability.

It is a second object of the present invention to provide an improved power working machine which can reliably prevent the human operator from accidentally touching the operation lever when operating the throttle lever and thereby permits the rotating operation of the operating handle with enhanced operability.

In order to accomplish the above-mentioned first object, the present invention provides a power working machine, which comprises: a machine body with a drive source mounted substantially centrally thereon; trimming blades attached to a front portion of the machine body and drivable by the drive source; an operating handle provided on a rear portion of the machine body for gripping by a human operator; a throttle lever provided on a front portion of the operating handle for pivotal movement between a non-operating position and an operating position, the output of the drive source being adjustable via the throttle lever; and a throttle lock lever provided on the operating handle for disabling the pivotal movement of the throttle lever when necessary. In the present invention, the operating handle is rotatably mounted on a shaft section extending from the machine body, and the operating handle includes: a lock mechanism for locking the operating handle at a desired rotational position relative to the machine body; and an operation lever for canceling locking, by the lock mechanism, of the operating handle (i.e., unlocking the lock mechanism) to thereby permit rotational movement of the operating handle and, simultaneously with the unlocking of the lock mechanism, placing the throttle lock lever in a locking position to disable the pivotal movement of the throttle lever.

Namely, the present invention is characterized primarily in that the operating handle is rotatably mounted on the shaft section extending from the machine body operation lever for canceling locking, by the lock mechanism, of the operating handle to thereby permit rotational movement of the operating handle and for simultaneously placing the throttle lock lever in the locking position to disable the pivotal movement of the throttle lever, so as to prevent or inhibit the throttle lever from being operated by the human operator during rotating operation of the handle. As a result, the human operator can perform the rotating operation of the handle with increased reliability, and thus the usability or operability of the inventive power working machine can be significantly enhanced.

In one embodiment of the present invention, the operation lever is disposed in a rear portion of the operating handle, and a non-rotatable, closed-loop-shaped fixed handle is provided separately from the operating handle and located forwardly of the drive source. With the non-rotatable, closed-loop-shaped fixed handle provided forwardly of the drive source, the human operator can perform the operation for rotating the handle while lifting up the working machine with his or her right hand holding a rear portion of the handle and left hand holding the fixed handle. In this way, the human operator can perform the rotating operation of the handle with operational ease, so that the overall usability (ease of use) of the inventive power working machine can be even further enhanced.

In one embodiment, the throttle lock lever includes a lock portion for permitting the pivotal movement of the throttle lever and simultaneously locking the operation lever. With the lock portion, the rotating operation of the handle is inhibited during operation, by the human operator, of the throttle lever. As a result, the throttle lever can be operated with increased reliability, and the operability of the inventive power working machine can be even further enhanced.

In one embodiment, the shaft section of the machine body has a plurality of locking grooves formed therein, and the lock mechanism has a projection capable of being fitted in any desired one of the locking grooves in the shaft section so that the operating handle can be locked at any desired one of a plurality of rotational angles relative to the machine body. As a result, the trimming work by the power working machine can be performed with enhanced workability.

According to another aspect of the present invention, there is provided a power working machine, which comprises: a machine body with a drive source mounted substantially centrally thereon; trimming blades attached to a front portion of the machine body and drivable by the drive source; an operating handle provided on a rear portion of the machine body for gripping by a human operator; and a throttle lever provided on a front portion of the operating handle for pivotal movement between a non-operating position and an operating position, the output of the drive source being adjustable via the throttle lever. The operating handle is generally in the shape of a closed loop and rotatably mounted on a shaft section extending from the machine body, and the operating handle includes: a lock mechanism for locking the operating handle at a desired rotational position relative to the machine body; and an operation lever for canceling locking, by the lock mechanism, of the operating handle to thereby permit rotational movement of the operating handle and simultaneously locking the throttle lever in the non-operating position.

Because the operating handle is generally in a closed loop shape, such as a rectangular loop or letter "O" shape, the human operator can, for example, shift his or her hand, gripping the throttle lever, over to the operation lever without temporarily unhanding the operating handle. As a result, the operating handle can be rotated by the human operator with increased ease.

Further, because the operation lever, which locks the throttle lever in the non-operating position simultaneously with unlocking of the lock mechanism, is located in a rear portion of the handle, the human operator is allowed to both unlock the lock mechanism and rotate the operating handle through a series of action, by just gripping the rear portion of the handle. Furthermore, because the throttle lever is located on a front portion of the handle remotely from the operation lever, it is possible to reliably prevent the human operator from accidentally touching the operation lever when operating the throttle lever. As a result, the operating handle can be rotated by the human operator with increased operational ease, and thus an "erroneous-operation preventing function" of the working machine can be significantly enhanced.

BRIEF DESCRIPTION OF THE DRAWINGS

Certain preferred embodiments of the present invention will hereinafter be described in detail, by way of example only, with reference to the accompanying drawings, in which:

FIG. 10 is a view explanatory of operation of the operating handle, which particularly shows various rotational positions the operating handle can be set in;

DETAILED DESCRIPTION OF THE PREFERRED EMBODIMENTS

Figure 1:
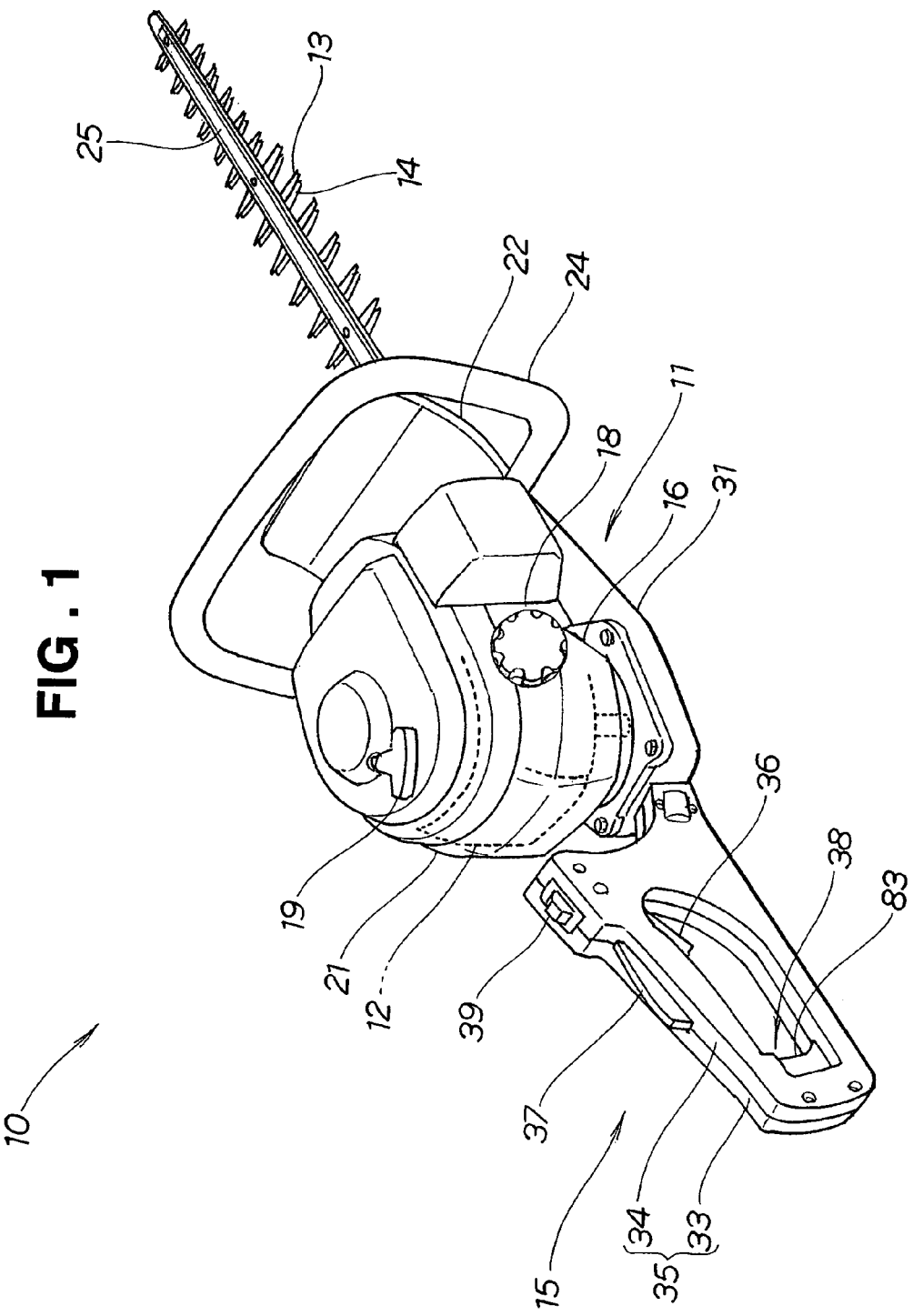
FIG. 1 is a perspective view of a power working machine in accordance with an embodiment of the present invention.

FIG. 1 is a perspective view of a power working machine in accordance with an embodiment of the present invention. The power working machine 10 of FIG. 1 is constructed as a "hedge trimmer", where a rotation force output from a drive source 12, such as an engine, is converted, after appropriate speed reduction, into reciprocating movement and the reciprocating movement is delivered to upper and lower cutting blades such as trimming blades 13 and 14 to trim a hedge. Also, in the power working machine 10, a rotatable operating handle 15 can be turned or rotated relative to the machine body in accordance with an operating posture or position of a human operator (user) when trimming and upper or side surface of a hedge.

Figure 2:
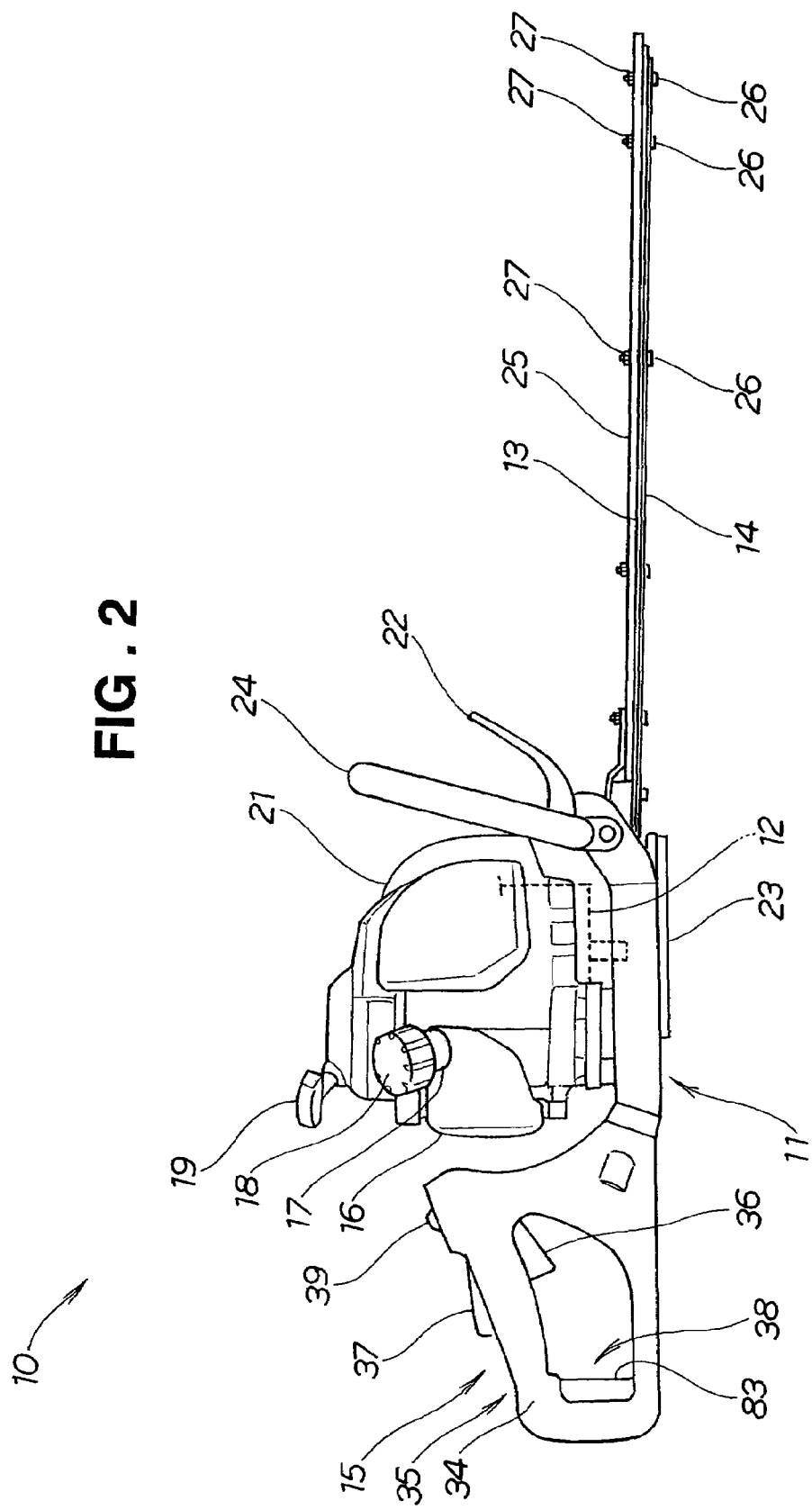
FIG. 2 is a side view of the power working machine of the present invention.

FIG. 2 is a side view of the power working machine 10. As shown, the power working machine (hedge trimmer) 10 includes the drive source 12 mounted generally centrally on a machine body 11, a fuel tank 16 for holding fuel to be supplied to the drive source 12, and a cap 18 covering a fill opening of the fuel tank 16. The power working machine 10 also includes a recoil starter knob 19 operable to activate the drive source 12, a cover 21 covering the drive source 12, and a protector 22 disposed on a front surface portion of the drive source 12 for preventing scattering of trimmed branches and leaves. Further, the power working machine 10 includes a cover member 23 provided on the underside of the machine body 11 for sliding movement on and along a hedge or the like to go on with desired trimming work, the rotatable operating handle 15 rotatably mounted rearwardly of the machine body 11 for being held or gripped with one hand of the human operator to support the machine body 11 with one hand during the trimming work, and a non-rotatable gripping handle in the form of a closed-loop-shaped fixed handle 24 provided forwardly of the machine body 11 for being held or gripped with the other hand of the human operator during the trimming work. Further, the power working machine 10 includes a support frame 25 extending forwardly of the machine body 11 (i.e., away from the human operator) and having the upper and lower trimming blades 13 and 14 supported thereon in such a manner that the trimming blades 13 and 14 are slidable back and forth along the support frame 25, a plurality of screws 26 fastening the trimming blades 13 and 14 to the support frame 25, and a plurality of nuts screwed on the screws 26.

Figure 3:
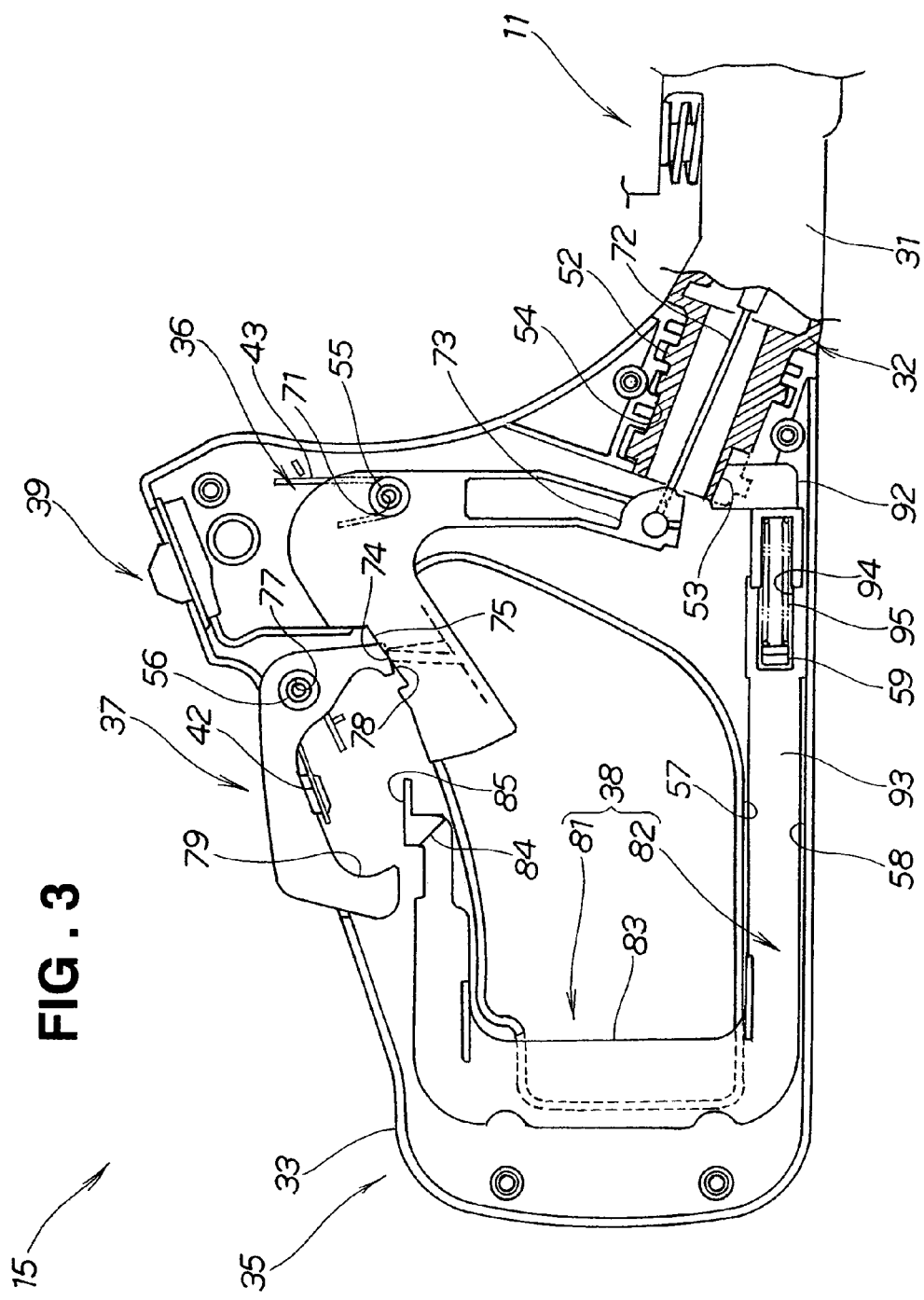
FIG. 3 is a partly-sectional side view of an operating handle employed in the power working machine of the present invention.

FIG. 3 is a partly-sectional side view of the operating handle 15 of the power working machine 10, which particularly shows one of left and right handle halves (left handle half 33 in the illustrated example of FIG. 3) with the other handle half 34 removed for clarity. Case member 31 is mounted on the machine body 11 and accommodates therein mechanisms for reducing the rotation speed of the drive source 12 and for converting the speed-reduced rotation force into reciprocating movement, and a shaft section 32 is attached to the case member 31 so that the handle 15 is mounted for rotation relative to the machine body 11.

The operating handle 15 includes a handle body 35 composed of the left and right handle portions or halves 33 and 34 (only the left handle half 33 is shown in FIG. 3), a throttle lever 36 rotatably connected to the handle body 35 for adjusting the output power of the drive source 12 (see FIG. 2), and a throttle lock lever 37 pivotally connected to the handle body 35 for locking the throttle lever 36. The operating handle 15 further includes a lever unit in the form of a lever complex 38 connected to the handle body 35 and slidable in the front-and-rear direction of the working machine 10 for locking the throttle lock lever 37 whenever necessary and locking the handle 15 against the shaft section 32 and hence the machine body 11 at a desired rotational angle, and a starter switch 39 for activating/deactivating the drive source 12. The throttle lever 36 includes a torsion spring 43 for returning the lever 36 to its initial position, and similarly the throttle lock lever 37 includes a torsion spring 42 for returning the lever 37 to its initial position.

Figure 4:
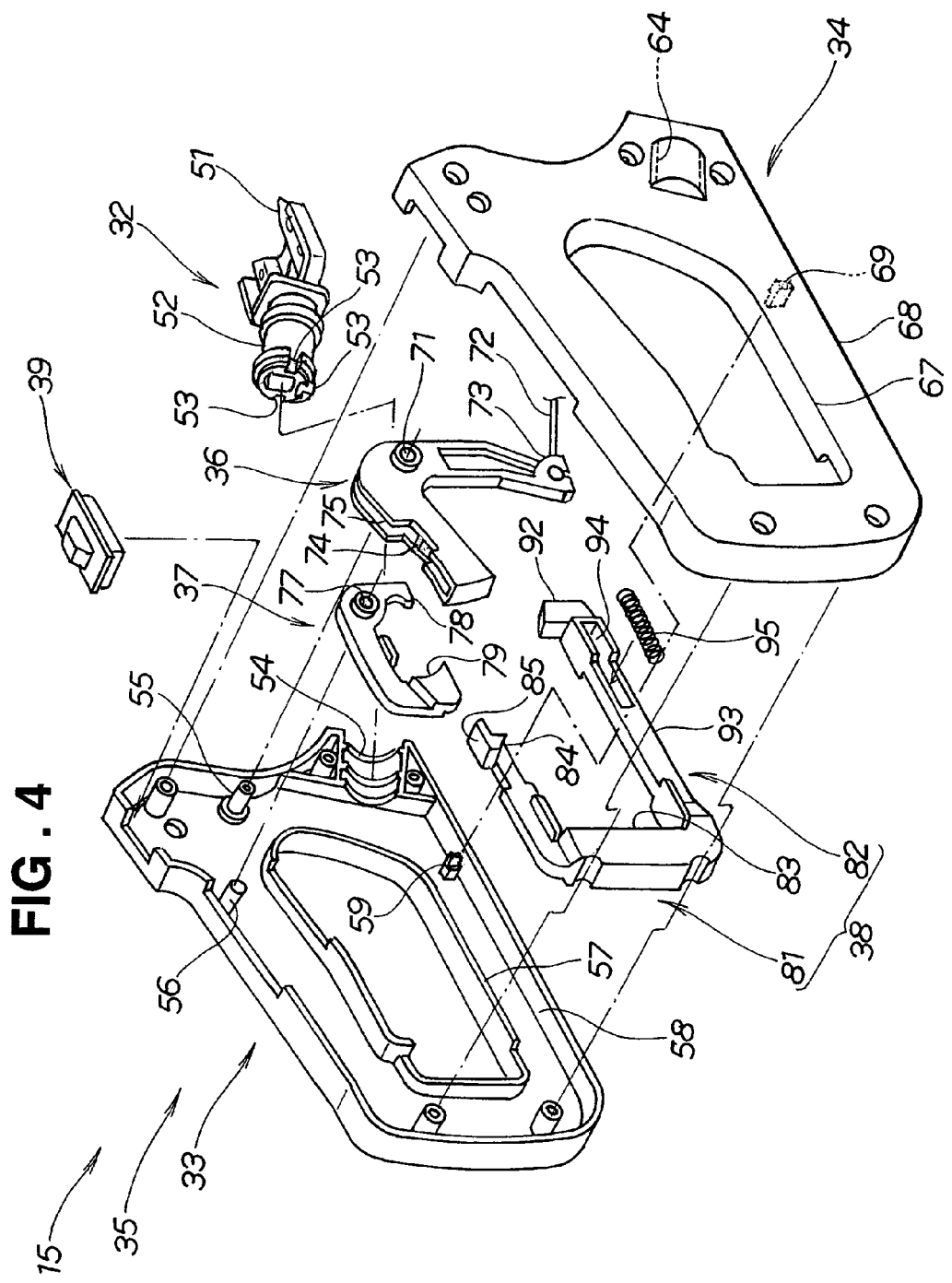
FIG. 4 is an exploded perspective view showing principal components of the operating handle employed in the power working machine of the present invention.

FIG. 4 is an exploded perspective view showing principal components of the operating handle 15 employed in the power working machine 10 of FIG. 1. The shaft section 32 of the machine body 11 has a mounting portion 51 to be secured to the case member 31, a cylindrical portion 52 for rotatably supporting the handle body 35, and a plurality of locking grooves 53 for locking the handle body 35 at a desired rotational angle.

The left handle half 33 has a left fitting portion 54 for fitting around the shaft section 32, a boss 55 for rotatably mounting thereon the throttle lever 36, a boss 56 for rotatably mounting thereon the throttle lock lever 37, upper and lower guide portions 57 and 58 for slidably mounting thereon the lever complex 38, and a left spring supporting rib.

The right handle half 34 has a right fitting portion 64 for fitting around the shaft section 32, upper and lower guide portions 67 and 68 for slidably mounting thereon the lever complex 38, and a right spring supporting rib 69.

The throttle lever 36 has a hole portion 71 for rotatably fitting over the throttle-lever mounting boss 55, a support portion 73 for supporting one end of a throttle wire 72, an engagement portion 74 for abutting engagement with the throttle lock lever 37, and a guide portion 75 for allowing part of the throttle lock lever 37 to escape from the engagement portion 74.

The throttle lock lever 37 has a hole portion 77 for fitting over the throttle-lock-lever mounting boss 56, an actuator portion 78 provided for abutting engagement with the engagement portion 74 or escaping movement therein, and a lock portion 79 for locking the lever complex 38.

The lever complex 38 includes an upper lever section 81 functioning as an operation lever (lock cancellation lever or unlocking lever), and a lower lever section 82 integrally formed with the upper lever section 81 and functioning as a lock mechanism.

The upper lever section 81 includes an operation portion 83 projecting inwardly from a rear end portion of the handle body 35 and operable by the human operator, a fitting portion 84 for fitting engagement with the lock portion 79 of the throttle lock lever 37 when the lock lever 37 is pressed into place of the handle body 35, and a stopper portion 85 for stopping movement of the throttle lock lever 37.

Figure 5:
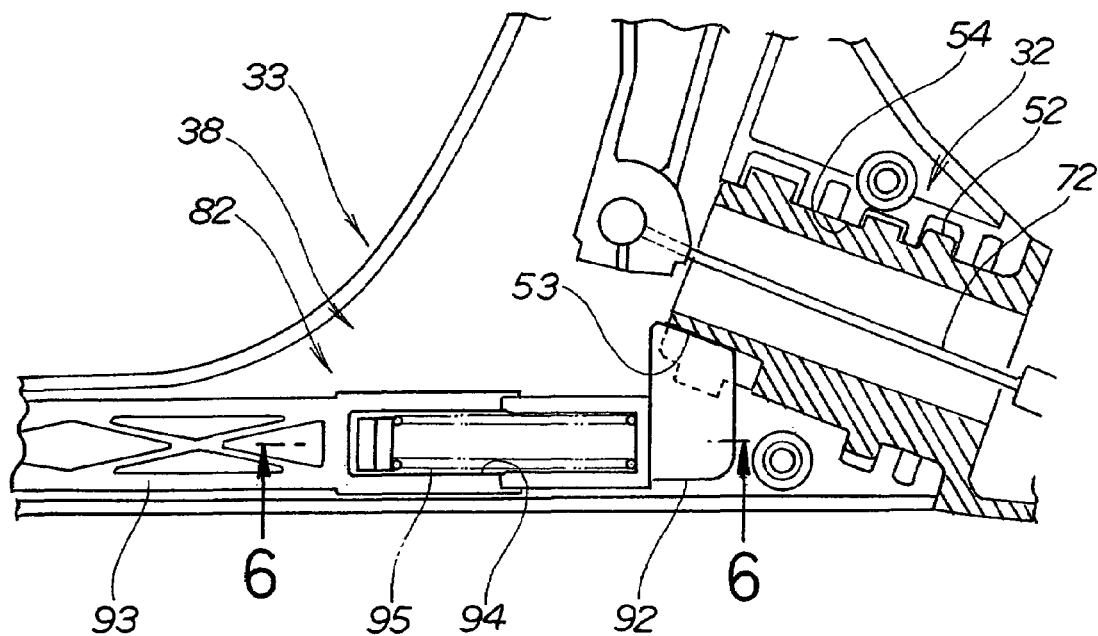
FIG. 5 is a sectional view of a lock mechanism in the power working machine of the present invention.

FIG. 5 is a sectional view of the lock mechanism of the power working machine 10. The lower lever section (i.e., lock mechanism) 82 has a projection 92 for fitting engagement with any desired one of the locking grooves 53 of the shaft section 32, a horizontal portion (an arm portion) 93 extending from the projection 92 toward the rear of the handle 15 (i.e., toward the human operator), a spring holding portion 94 formed in the horizontal portion 93, and a return spring 95 having its front end held by the spring holding portion 94 and its rear end held by the left and right spring supporting ribs 59 and 69 (see FIG. 4) in such a manner that it normally urges the entire level complex 38 toward the initial position.

Figure 6:
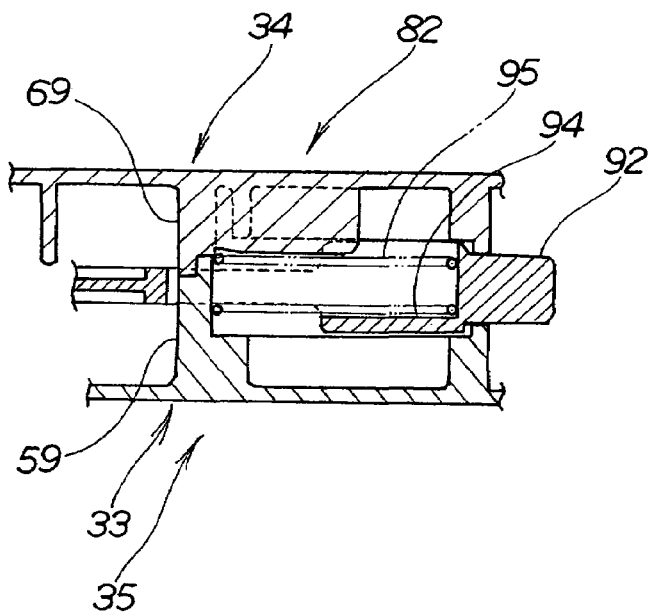
FIG. 6 is a sectional view taken along the 6—6 line of FIG. 5.

FIG. 6 is a sectional view taken along the 6—6 line of FIG. 5. As seen in FIG. 6, the lower lever section (i.e., lock mechanism) 82 has the return spring 95 accommodated in the spring holding portion 94, and the return spring 95 is supported at its rear end held by the left and right spring supporting ribs 59 and 69 and normally urges the lever complex 38 toward the front of the operating handle 15 (see FIG. 2).

Thus, by the human operator pulling the lever complex 38 of FIG. 5 toward the rear of the handle 15 (i.e., toward the human operator), the projection 92 of the lower lever section (i.e., lock mechanism) 82 can be disengaged from one of the locking grooves 53 of the shaft section 32, so as to permit the human operator to rotate the handle 15. Further, as the user releases (i.e., unhands) the lever complex 38 after having rotated the handle 15 through a desired rotational angle, the projection 92 can be automatically brought into engagement with another desired one of the locking grooves 53.

Figure 7:
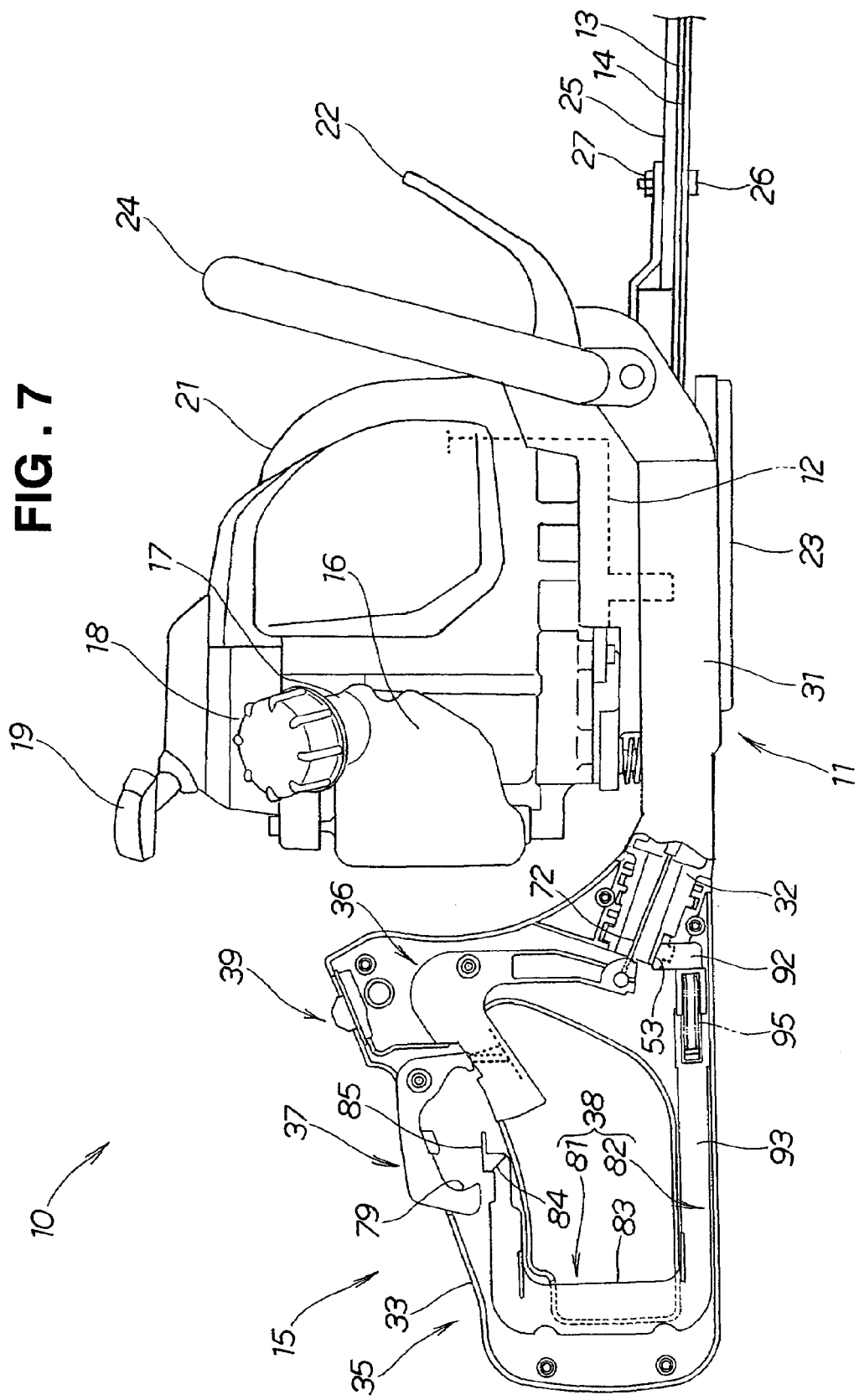
FIG. 7 is a view showing in enlarged scale principal sections of the power working machine of the present invention.

FIG. 7 is a view showing in enlarged scale principal sections of the power working machine 10. As shown, in the power working machine 10, the trimming blades 13 and 14 are attached to a front end portion of the machine body 11 for trimming braches and leaves, and the operating handle 15 to be gripped by the human operator is mounted on a rear end portion of the machine body 11. The throttle lever 36 is mounted on a front end portion of the operating handle 15 for pivotal movement between its operating and non-operating positions, and the throttle lock lever 37 is pivotally mounted on the operating handle 15 for inhibiting or disabling, as necessary, the pivotal movement of the throttle lever 36. The drive source 12 mounted substantially centrally on the machine body 11 drives the trimming blades 13 and 14, and the output power of the drive source 12 is adjusted via the throttle lever 36. Further, in the power working machine 10, the operating handle 15 is rotatably connected to the shaft section 32 extending from the machine body 11, and the lower lever section (i.e., lock mechanism) 82 is provided in the operating handle 15 in such a manner that the rotating operation of the handle 15 is permitted by placing the lower lever section 82 in its unlocking position (to release the handle 15 from the locked state). The upper lever section (operation lever) 81 is also provided in the operating handle 15 for locking the throttle lock lever 37 simultaneously with the unlocking operation of the lower lever section 82.

Simplification of the rotating operation of the operating handle 15 is very desirable in that it can significantly enhance the workability of the handle 15, and allowing the operation of the throttle lever and the rotating operation of the handle 15 to be performed with increased reliability is also desirable in that it can effectively prevent erroneous operation.

Therefore, the power working machine 10 of the present invention is characterized in that the upper lever section (operation lever) 81 provided in the operating handle 15 is arranged to permit the rotating operation of the handle 15 by placing the lower lever section (lock mechanism) 82 in its unlocking position and simultaneously lock the throttle lock lever 37. With such arrangements, the throttle lever 36 is disabled or inhibited from being operated by the human operator during the rotating operation of the operating handle 15. As a result, the rotating operation of the operating handle 15 can be performed with increased reliability, which can thereby enhance the workability of the power working machine 10.

Furthermore, in the power working machine 10, the upper lever section (operation lever) 81 is provided in a rear end portion of the operating handle 15 for operation by the human operator, and the non-rotatable, closed-loop-shaped fixed handle 24 is provided forwardly of the machine body 11 separately from the rotatably operating handle 15. In this way, the human operator can perform the rotating operation of the handle 15 while lifting up the working machine 10, for example, with his or her right hand holding a rear portion of the operating handle 15 and his or her left hand holding the fixed handle 24. As a result, the rotating operation of the operating handle 15 can be performed with increased operational ease and workability.

Furthermore, in the power working machine 10, the throttle lock lever 37 includes the lock portion 79 for permitting pivotal movement of the throttle lever 36 and simultaneously locking the upper lever section (operation lever) 81, so that the rotating operation of the operating handle 15 can be prevented during operation of the throttle lever 36; this arrangement too can enhance the usability or operability of the power working machine 10.

Furthermore, in the power working machine 10, the lower lever section (i.e., lock mechanism) 82 has the projection 92 for fitting engagement with any one of the locking grooves 53 of the shaft section 32, so that the operating handle 15 can be locked at any desired one of a plurality of rotational angles relative to the machine body 11; this arrangement can enhance the workability of the machine 10 during the trimming work.

Next, behavior of the embodiment of the power working machine 10 will be described.

Figure 8A:
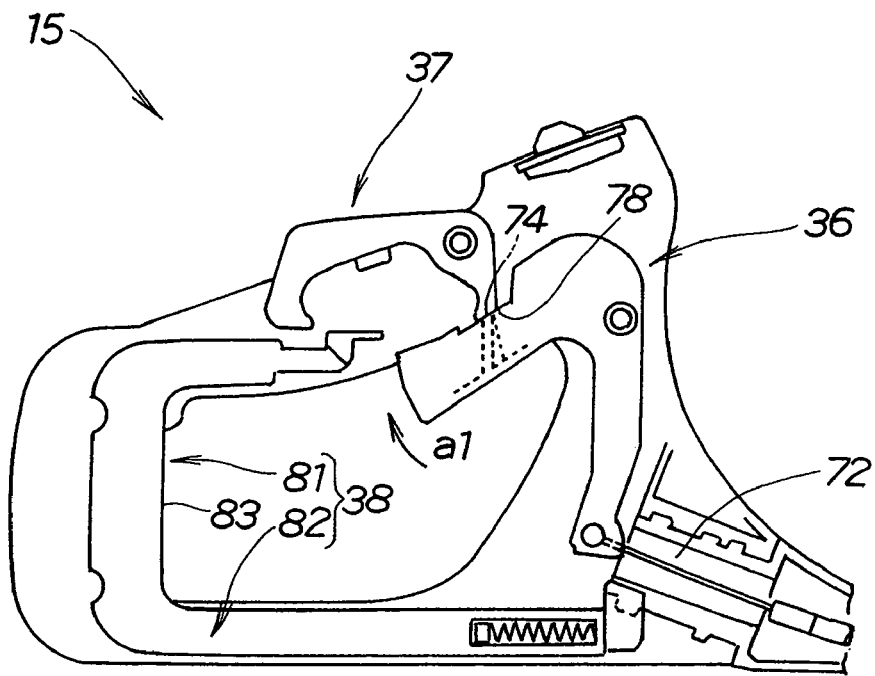
FIGS. 8A and 8B are views explanatory of how the operating handle and lever complex are locked in the power working machine of the present invention.
Figure 8B:
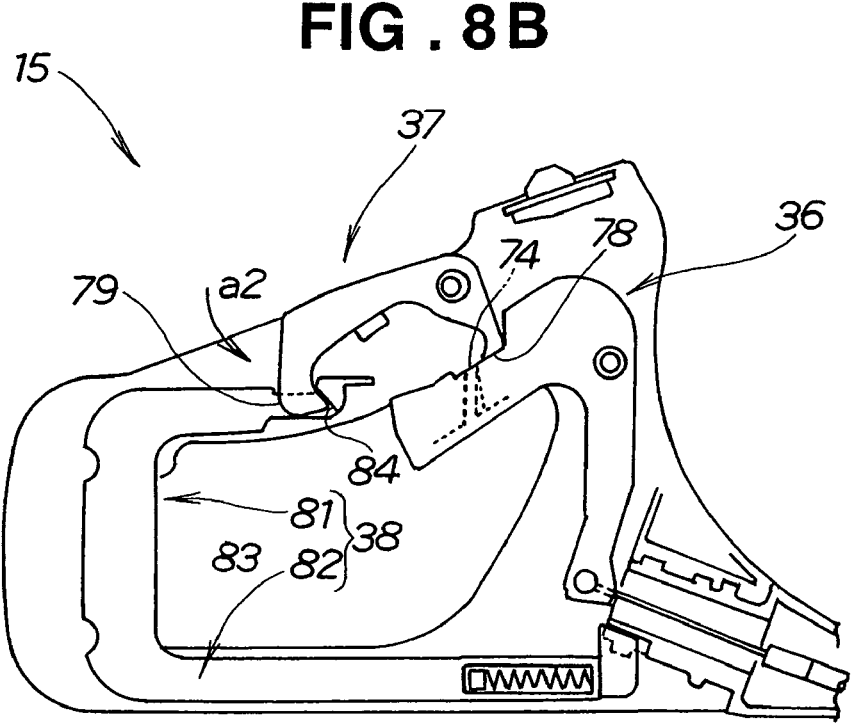

FIGS. 8A and 8B are views explanatory of how the operating handle 15 and lever complex 38 are locked.

In FIG. 8A, the actuator portion 78 of the throttle lock lever 37 is normally abutted against the engagement portion 74 of the throttle lever 36, so that the throttle lever 36 can be prevented from being erroneously pulled in the direction of arrow a1.

As shown in FIG. 8B, by the human operator pressing the throttle lock lever 37 as indicated by arrow a2, the actuator 78 is forced away from the engagement portion 74, and the lock portion 79 is fitted in the fitting portion 84 of the upper lever section (operation lever) 81. In this way, the throttle lever 36 is brought into its operating position, while the lever complex 38 is placed in the locked position. Thus, the handle 15 can be reliably prevented from being rotated relative to the machine body 11 during operation of the throttle lever 36.

Figure 9A:
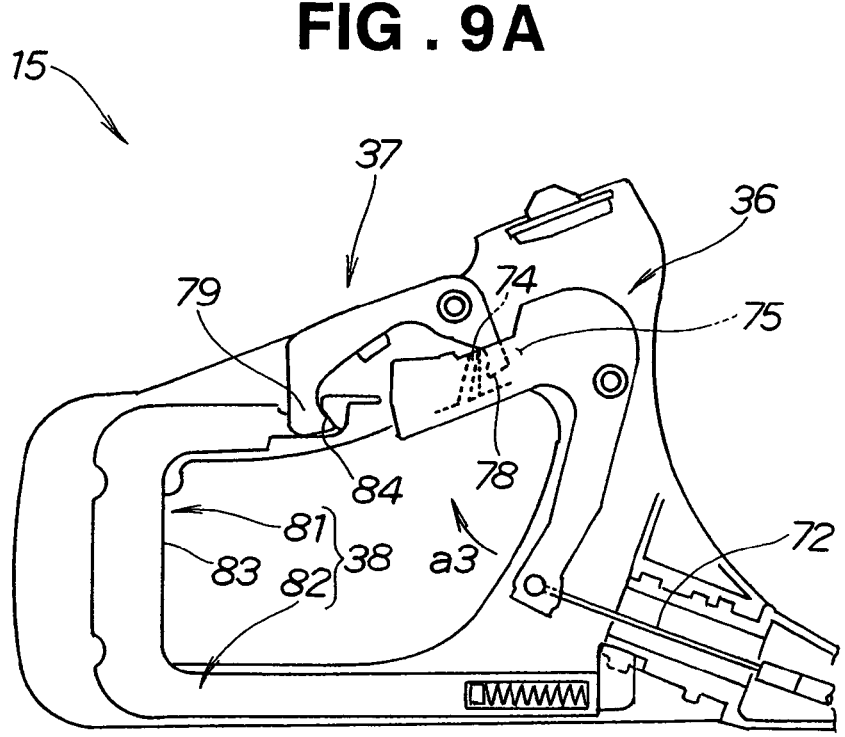
FIGS. 9A and 9B are views explanatory of how a throttle lever and operating handle are operated in the power working machine power working machine of the present invention.
Figure 9B:
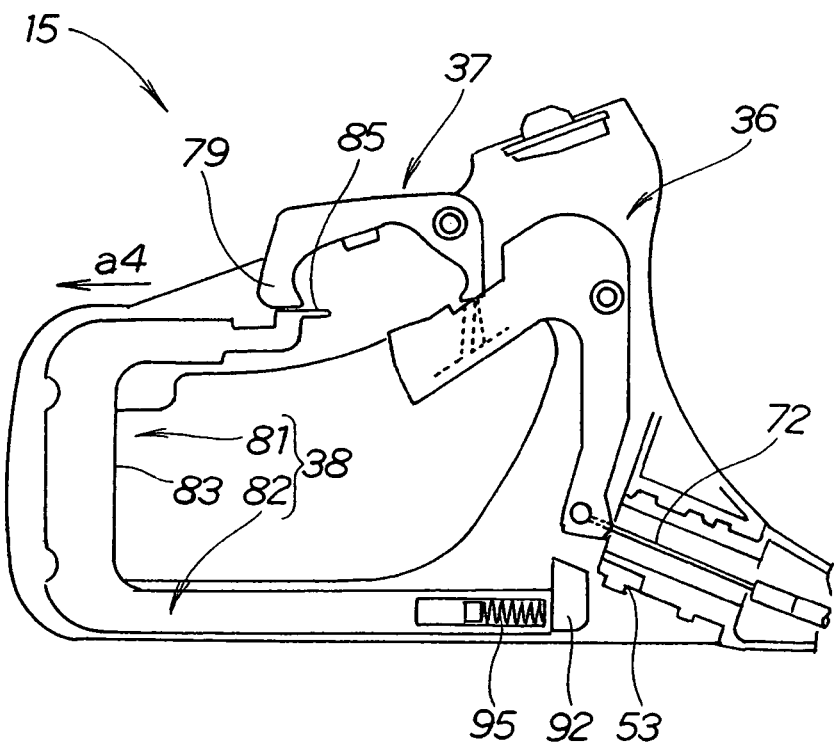

FIGS. 9A and 9B are views explanatory of how the throttle lever 36 and the operating handle 15 are operated in the power working machine 10.

As the throttle lever 36 is pulled upward by the human operator as depicted by arrow a3 in FIG. 9A, the actuator portion 78 of the throttle lock lever 37 is allowed to escape to the guide portion 75 of the throttle lever 36, so that the upper and lower trimming blades 13 and 14 of FIG. 1 can be actuated via the drive source 12 to perform the trimming work.

As illustrated in FIG. 9B, by the human operator gripping together a rear portion of the operating handle 15 and the operation portion 83 of the upper lever section 81 when the throttle lever 36, throttle lock lever 37 and lever complex 38 are in their respective positions of FIG. 8A, the lever complex 38 can be pulled in the direction of arrow a4 with the return spring 95 compressed, so that the projection 92 is disengaged from the locking groove 53. Thus, rotating operation, by the human operator, of the handle 15 is now permitted, simultaneously with which the pivotal movement of the throttle lock lever 37 is disabled or inhibited with the lock portion 79 engaged by the stopper portion 85 of the upper lever section 81. As a consequence, the throttle lock lever 37 can be reliably prevented from being moved or operated during the rotating operation of the handle 15, which thereby prevents erroneous operation of the throttle lever 36.

As, in such conditions, the human operator rotates the operating handle 15 to cause the projection 92 to front a desired one of the locking grooves 53 and then releases the operation portion 83, the projection 92 can be fitted into and locked by the desired locking groove 53 by returning (resilient) action of the return spring 95.

Figure 10:
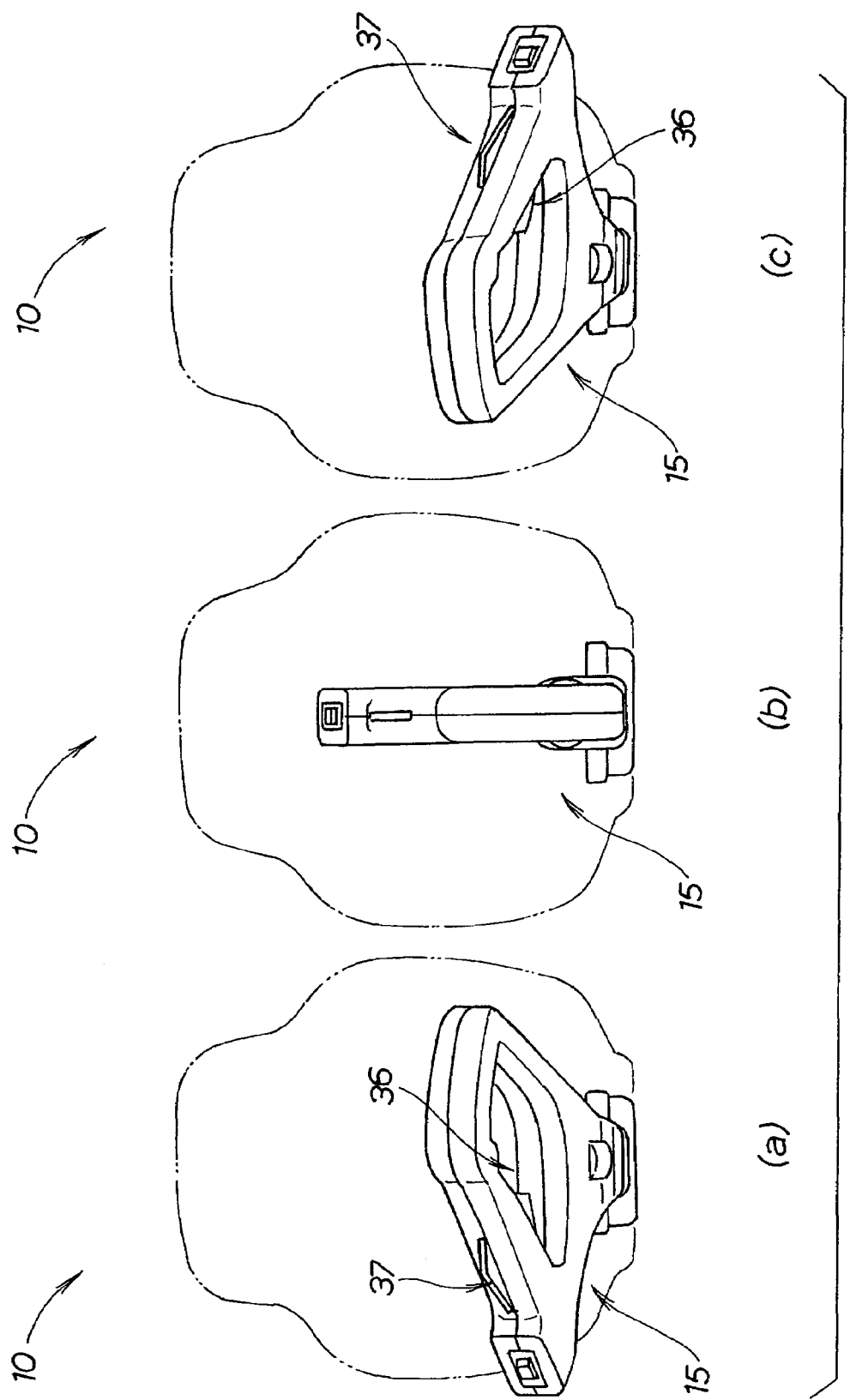

FIG. 10 is a view explanatory of operation of the operating handle 15, which particularly shows various rotational positions the handle 15 can be set in.

Section (a) of FIG. 10 shows the operating handle 15 set in a position rotated leftward or counterclockwise by 90° from its normal, upright position, and this position is suitable, for example, for trimming a lower side surface of a hedge or the like. Section (b) of FIG. 10 shows the operating handle 15 set in the normal, upright position, which is suitable, for example, for trimming an upper surface of a hedge or the like. Section (c) FIG. 10 shows the operating handle 15 set in a position rotated rightward or clockwise by 90° from the normal, upright position, and this position is suitable, for example, for trimming an upper side surface of a hedge or the like.

Figure 11:
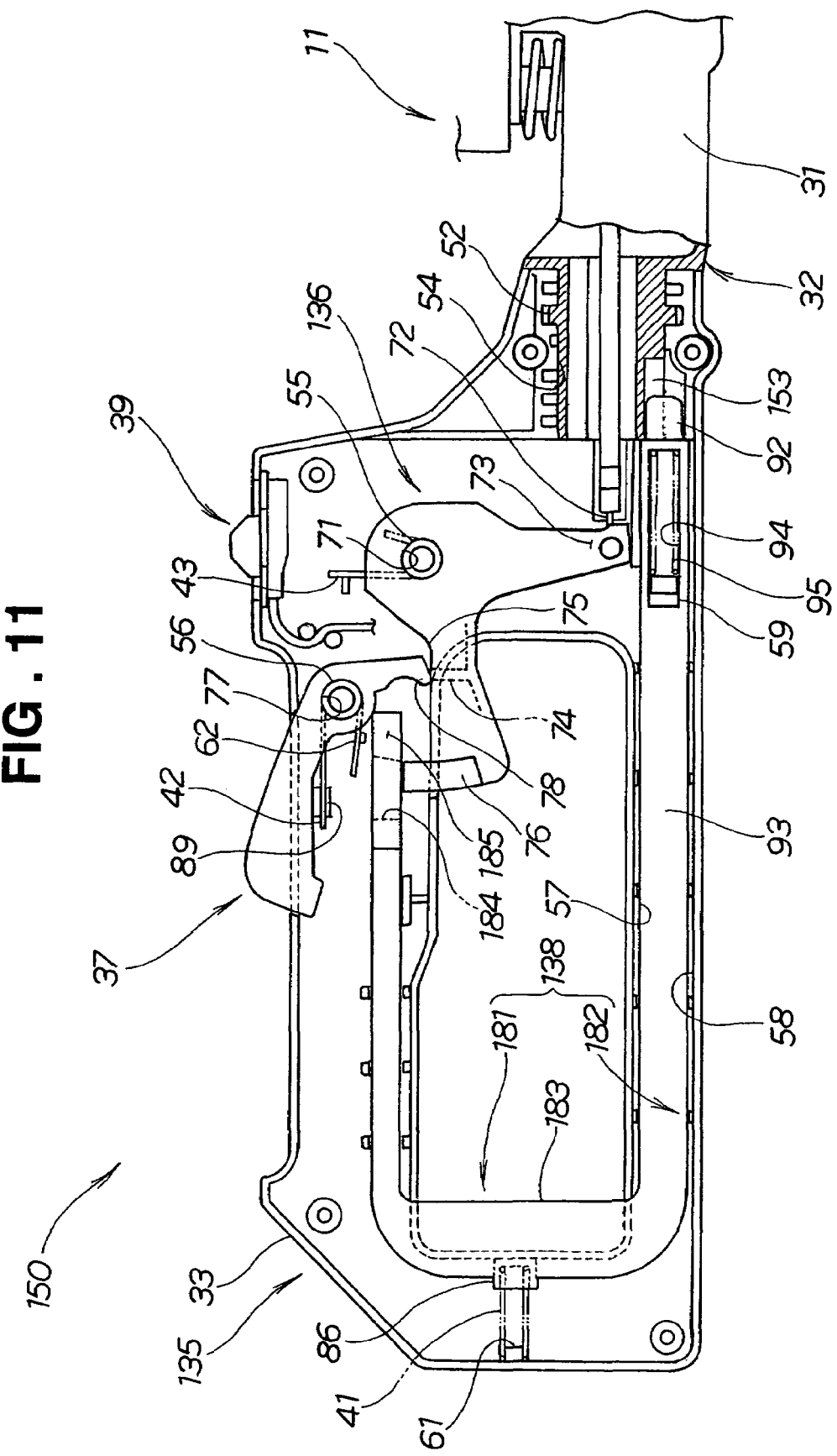
FIG. 11 is a partly-sectional side view showing a modification of the power working machine.

FIG. 11 is a partly-sectional side view showing a modification of the power working machine 10 of the present invention, which particularly shows a modified rotatable operating handle 150 of the power working machine 10; in the figure, there is shown one of the left and right handle halves (left handle half 33 in the illustrated example of FIG. 11) with the other handle half 34 removed for clarity. In FIG. 11, the same elements as in the above-described embodiment of FIG. 3 are represented by the same reference numerals and will not be described in detail to avoid unnecessary duplication. The rotatable operating handle 150 of FIG. 11 has a shape of a rectangular loop or letter "O" shape (i.e., closed-loop shape), in which a compression spring 41 is provided between an outer wall portion of the handle body 135 and the lever complex 138 for normally urging the lever complex 138 in the forward direction of the machine 10 (i.e., away from the human operator). The torsion spring 42 for returning the throttle lock lever 37 to its initial position is provided between the lock lever 37 and the left handle half 33.

Figure 12:
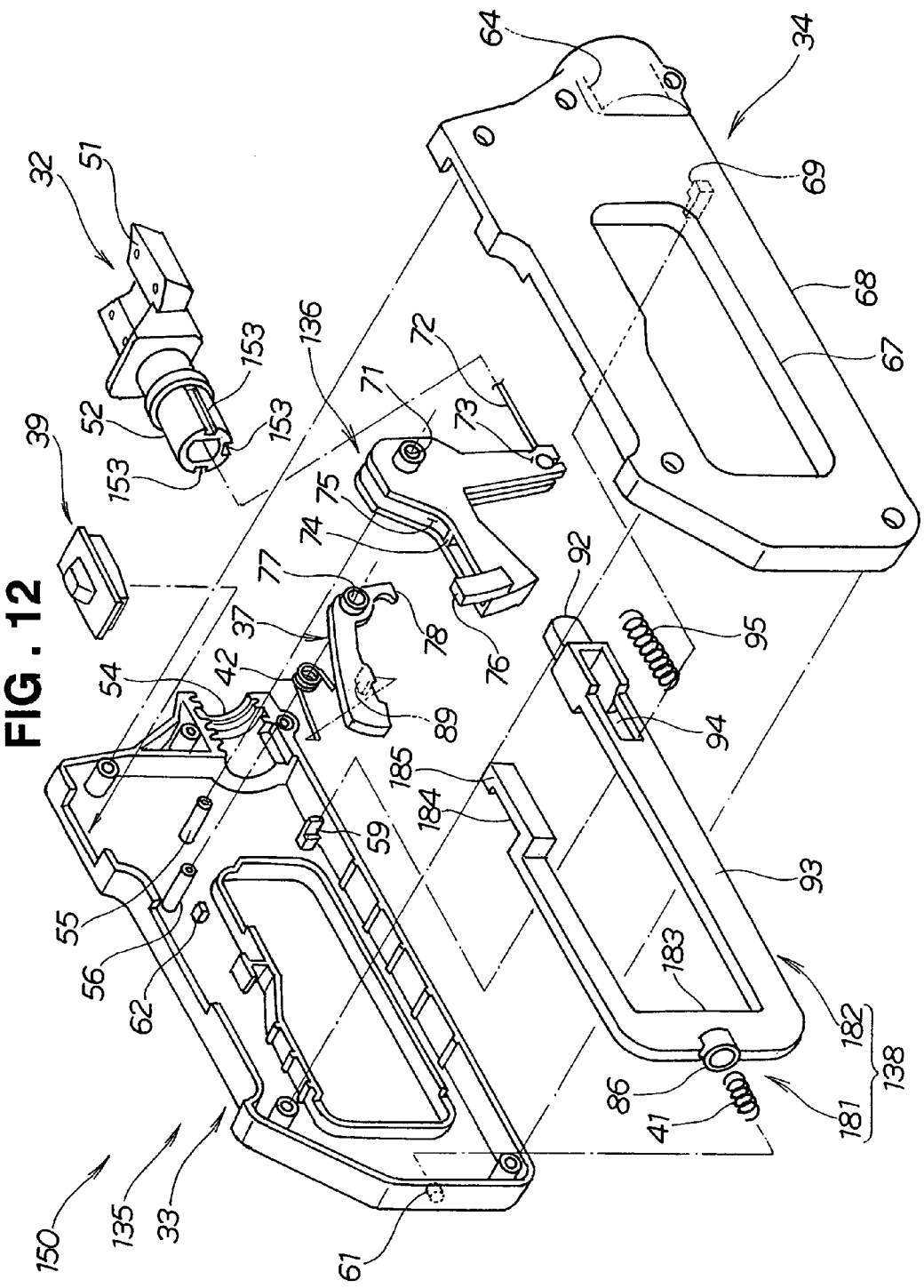
FIG. 12 is an exploded perspective view showing principal components of an operating handle in the modified power working machine of FIG. 11.

FIG. 12 is an exploded perspective view showing principal components of the modified operating handle 150 of FIG. 11, where the same elements as in FIG. 4 are represented by the same reference numerals and will not be described to avoid unnecessary duplication. The shaft section 32 has a plurality of axially-elongated locking grooves 153 for locking the handle body 135 at a desired rotational angle relative to the machine body 11.

The left handle half 33 has an engagement portion 61 for holding one end of the compression spring 41 normally urging the lever complex 138 in the forward direction, and another engagement portion 62 for holding one end of the torsion spring 42. Throttle lever 136, which adjusts the output power from the drive source, is mounted on a front portion of the handle 150 for adjusting the output power of the drive source 12, and the throttle lever 136 has a lock portion 76 for locking the lever complex 138 as will be later described. The throttle lock lever 37 has an engagement portion 89 for holding the other end of the torsion spring 42.

The lever complex 138 of the operating handle 150 includes an upper lever section 181 functioning as an operation lever (lock cancellation lever or unlocking lever), and a lower lever section 182 integrally formed with the upper lever section 181 and functioning as a lock mechanism.

The upper lever section 181 includes an operation portion 183 projecting inwardly from a rear end portion of the handle body 135, and a fitting portion 184 that is brought into fitting engagement with the lock portion 76 of the throttle lever 136 as the human operator grips the lever 136. The upper lever section 181 also has a stopper portion 185 for disabling the pivotal movement of the throttle lever 136 between the non-operating and operating positions by abutting against the lock portion 76 as the human operator moves or pulls the lower lever section 182 rearwardly.

Figure 13:
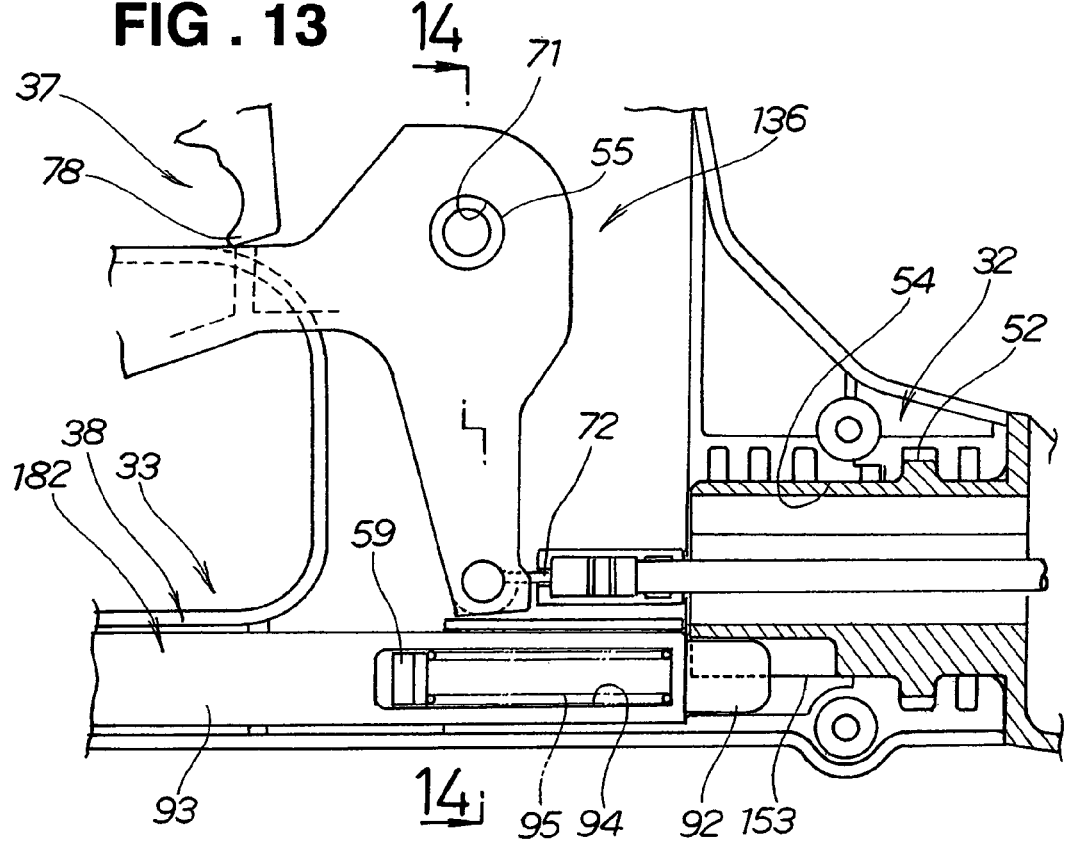
FIG. 13 is a sectional view of a lock mechanism of the modified power working machine of FIG. 11.

FIG. 13 is a sectional view of the lock mechanism of the power working machine 10. The projection of the lower lever section (i.e., lock mechanism) 182 is provided for fitting engagement with any desired one of the locking grooves 153 of the shaft section 32.

Figure 14:
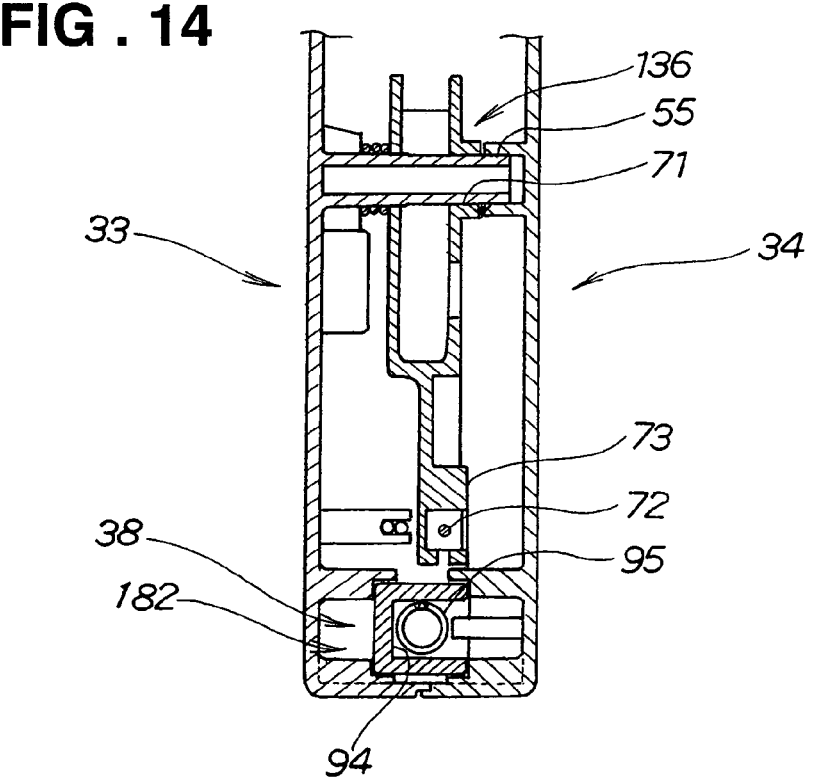
FIG. 14 is a sectional view taken along the 14—14 line of FIG. 13.

FIG. 14 is a sectional view taken along the 14—14 line of FIG. 13. The lower lever section (i.e., lock mechanism) 182 has the return spring 95 accommodated in the spring holding portion 94, and the return spring 95 is supported at its rear end held by the left and right spring supporting ribs 59 and 69 (see FIG. 12) and normally urges the lever complex 138 toward the front of the operating handle 150.

Thus, by the human operator pulling the lever complex 138 toward the rear of the operating handle 150, the projection 92 of the lower lever section (i.e., lock mechanism) 182 can be disengaged from one of the locking grooves 153 of the shaft section 32, so as to permit the human operator to rotate the handle 150. Further, as the user releases (i.e., unhands) the lever complex 138 after having rotated the handle 150 through a desired rotational angle, the projection 92 can be automatically brought into engagement with another desired one of the locking grooves 153 to complete desired rotational movement.

Figure 15:
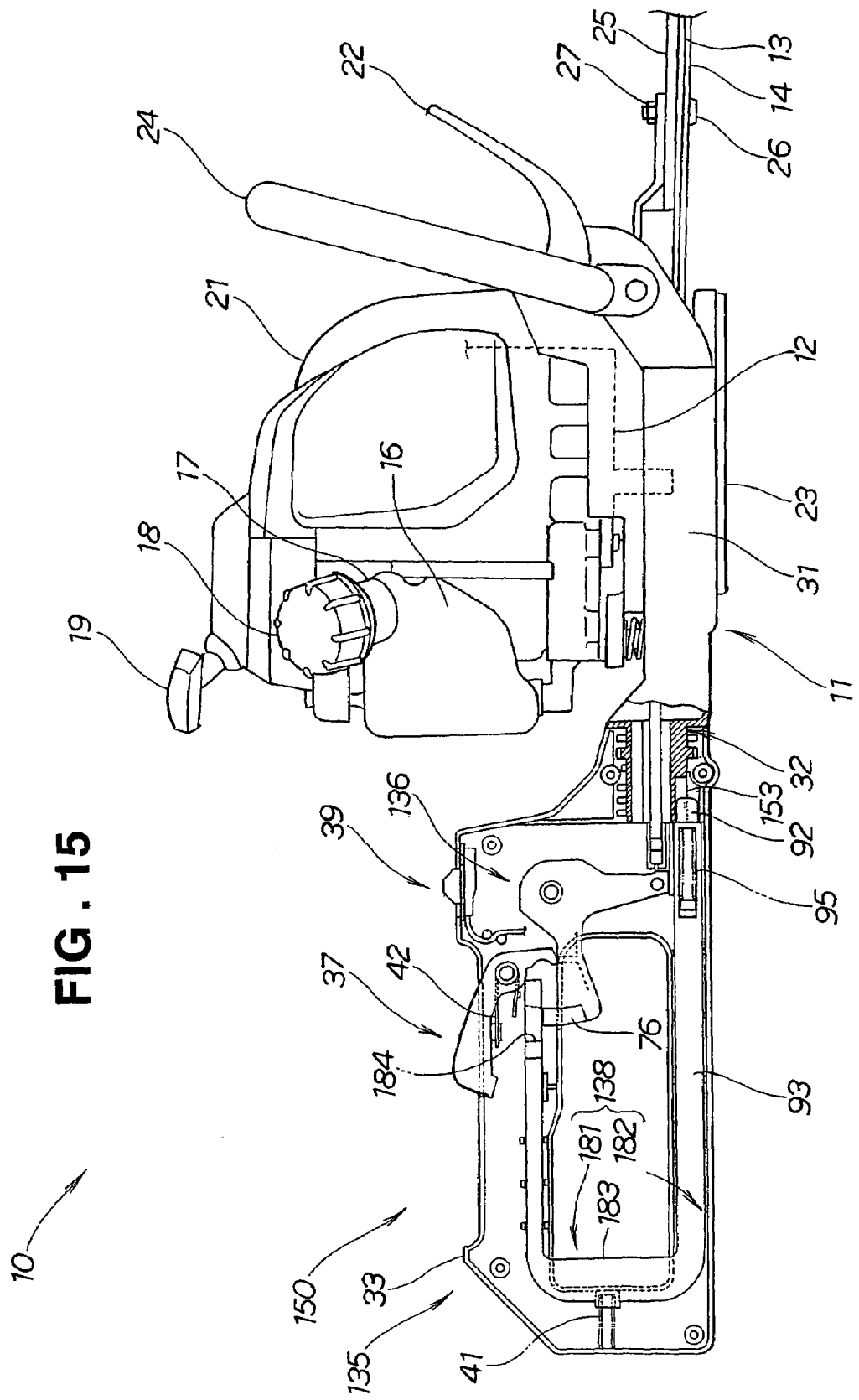
FIG. 15 is a view showing in enlarged scale principal sections of the modified power working machine.

FIG. 15 is a view showing in enlarged scale principal sections of the power working machine 10. In the modified power working machine 10 too, the operating handle 150 is rotatably mounted on the shaft section 32 extending from the machine body 11, and the lower lever section (i.e., lock mechanism) 182 is provided in the operating handle 150 in such a manner that the rotating operation of the handle 150 is permitted by placing the lower lever section 182 in its unlocking position (i.e., by unlocking the lower lever section 182). The upper lever section (operation lever) 181 is provided in the operating handle 150 for locking the throttle lever 136 in the non-operating position simultaneously with the unlocking of the lower lever section 182.

Reliably preventing the human operator to accidentally touch the operation lever 181, for example, when manipulating the throttle lever 136 is very preferable for an improvement in the erroneous-operation preventing function of the working machine 10, and allowing the human operator to perform the rotating operation of the operating handle 150 with increased operational ease is preferable in that it can enhance the overall ease of use of the working machine 10.

For such purposes, the operating handle 150 is in a closed loop shape, such as a rectangular loop or letter "O" shape, such that the human operator can, for example, shift his or her hand, e.g. gripping the throttle lever 136, over to the upper lever section (operation lever) 181 without temporarily unhanding the handle 150. As a result, the operating handle 150 can be rotated by the human operator with increased operational ease.

Further, because the upper lever section (operation lever) 181, which unlocks the lower lever section 182 to permit rotating operation of the handle 150 and, simultaneously with the unlocking of the lower lever section 182, locks the throttle lever 136 in the non-operating position, is located in a rear portion of the handle 150 such that the human operator can readily operate the upper lever section 181, the human operator is allowed to both place the lower lever section (lock mechanism) 182 in the unlocking position (i.e., unlocks the lock mechanism 182) and rotate the operating handle 150 through a series of action by just gripping the rear portion of the handle 150.

Furthermore, because the throttle lever 136 is located on a front portion of the handle 150 remotely from the upper lever section (operation lever) 181, it is possible to reliably prevent the human operator from accidentally touching the operation portion 183 when operating the throttle lever 136. As a result, the operating handle 150 can be rotated by the human operator with increased ease, and thus the erroneous-operation preventing function of the working machine 10 can be significantly enhanced.

Next, behavior of the modified power working machine 10 will be described.

Figure 16A:
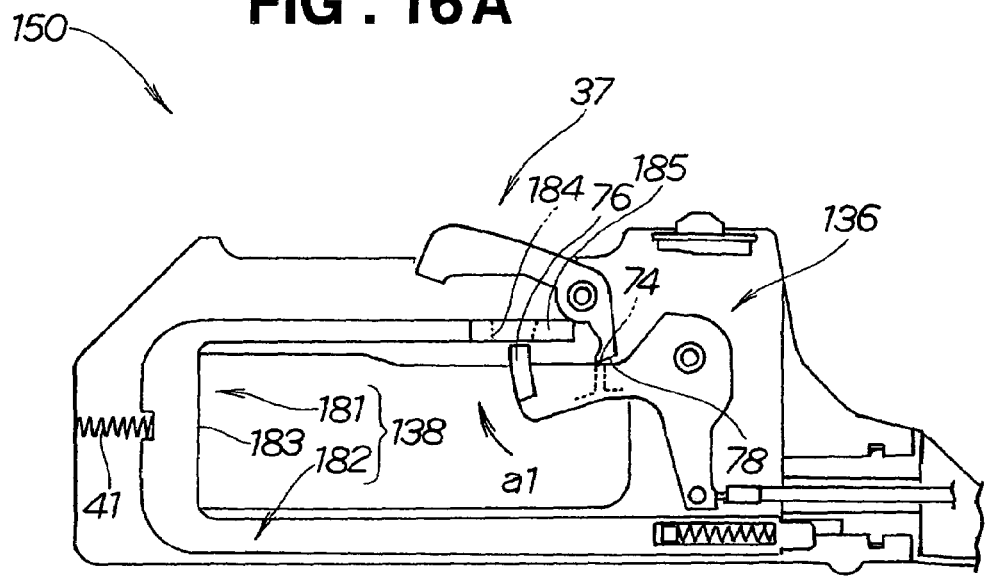
FIGS. 16A and 16B are views explanatory of how the operating handle and lever complex are locked in the modified power working machine.
Figure 16B:
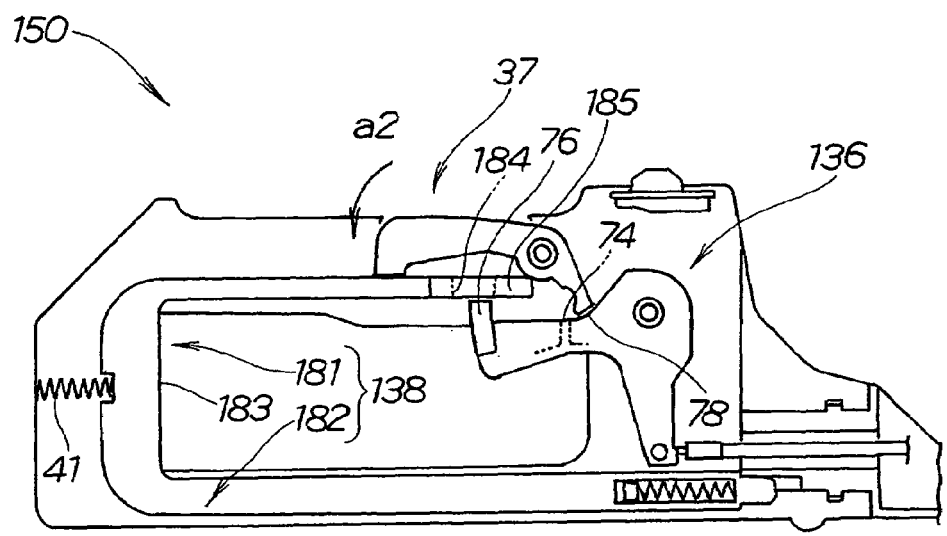

FIGS. 16A and 16B are views explanatory of how the operating handle 150 and lever complex 138 are locked.

In FIG. 16A, the actuator portion 78 of the throttle lock lever 37 is normally abutted against the engagement portion 74 of the throttle lever 136, so that the throttle lever 136 can be prevented from being erroneously pulled in the direction of arrow a1.

Figure 18:
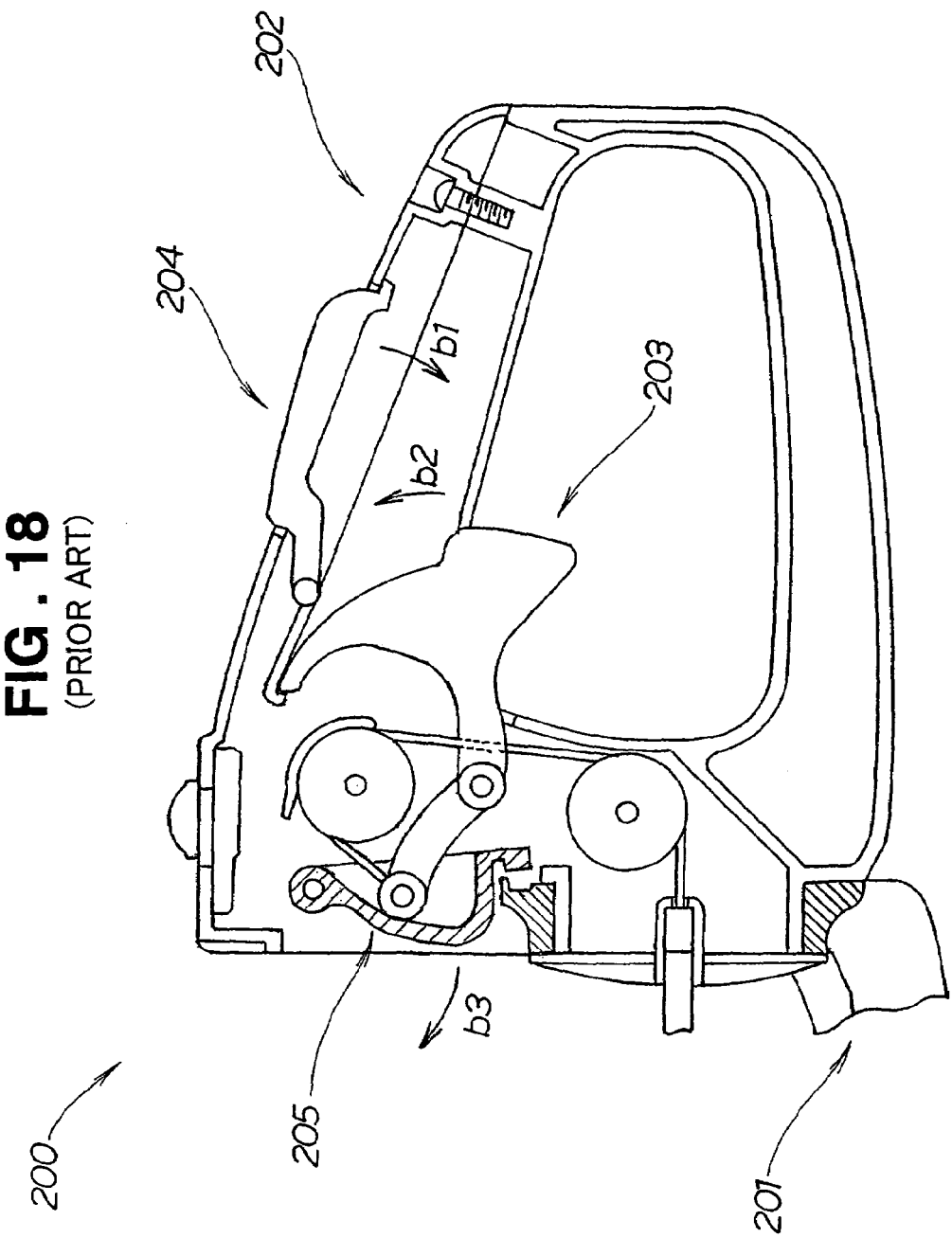
FIG. 18 is a view explanatory of a fundamental construction of a conventional power working machine.
Figure 19:
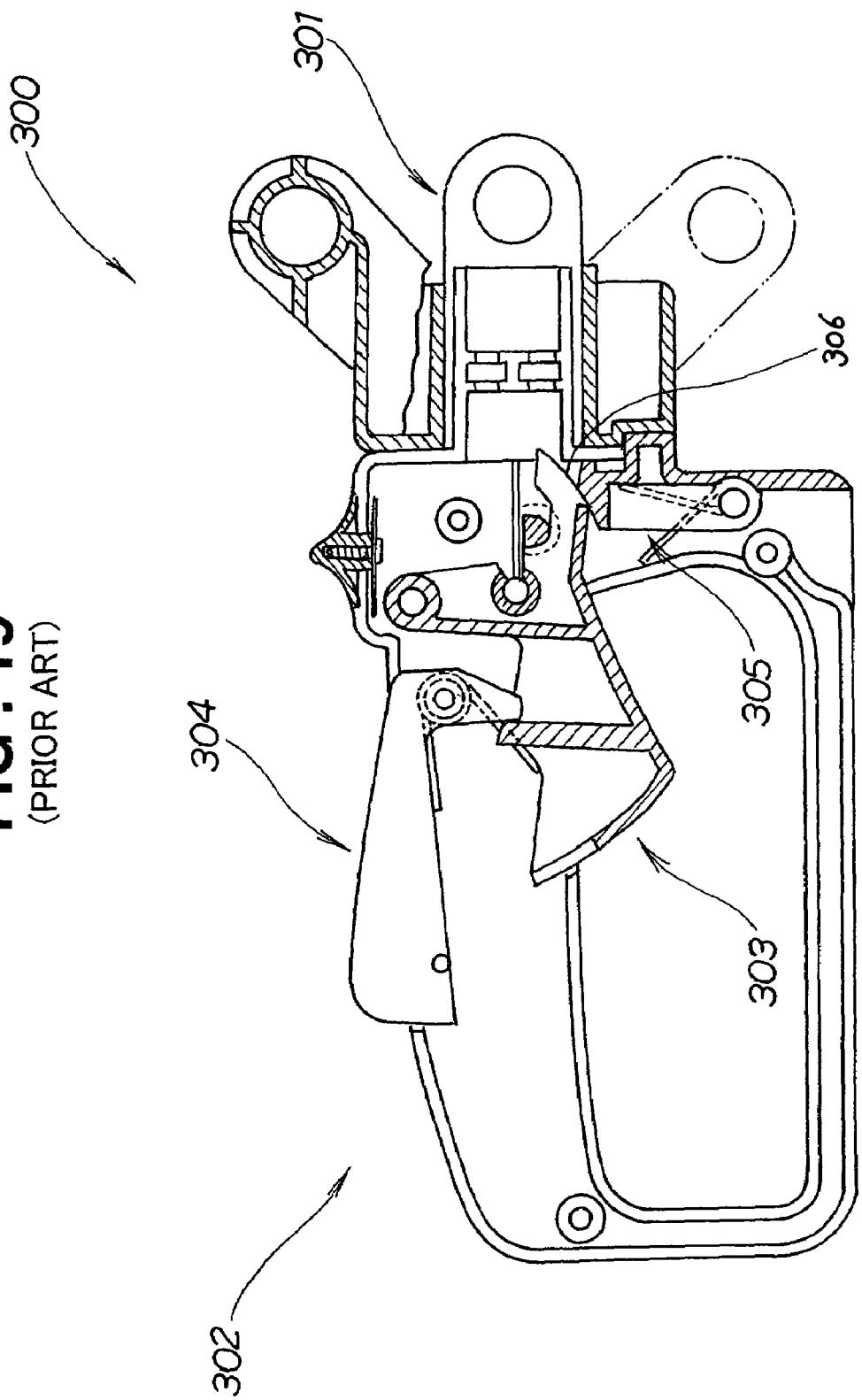
FIG. 19 is a view showing a fundamental construction of another conventionally-known power working machine.

As shown in FIG. 18B, by the human operator pressing the throttle lock lever 37 downward as indicated by arrow a2, the actuator 78 is forced away from the engagement portion 74, so that the throttle lever 136 can be brought into its operating position.

Figure 17A:
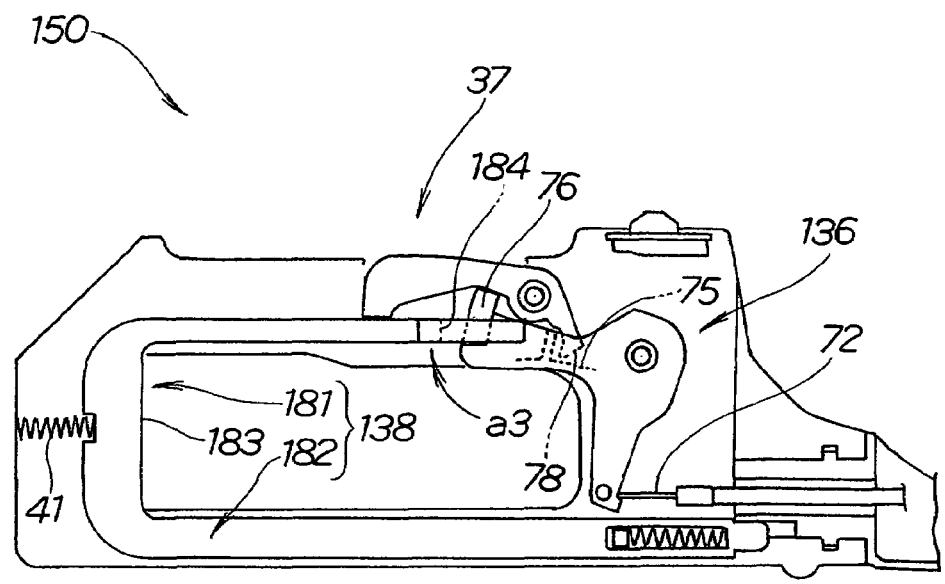
FIGS. 17A and 17B are views explanatory of how a throttle lever and operating handle are operated in the modified power working machine.
Figure 17B:
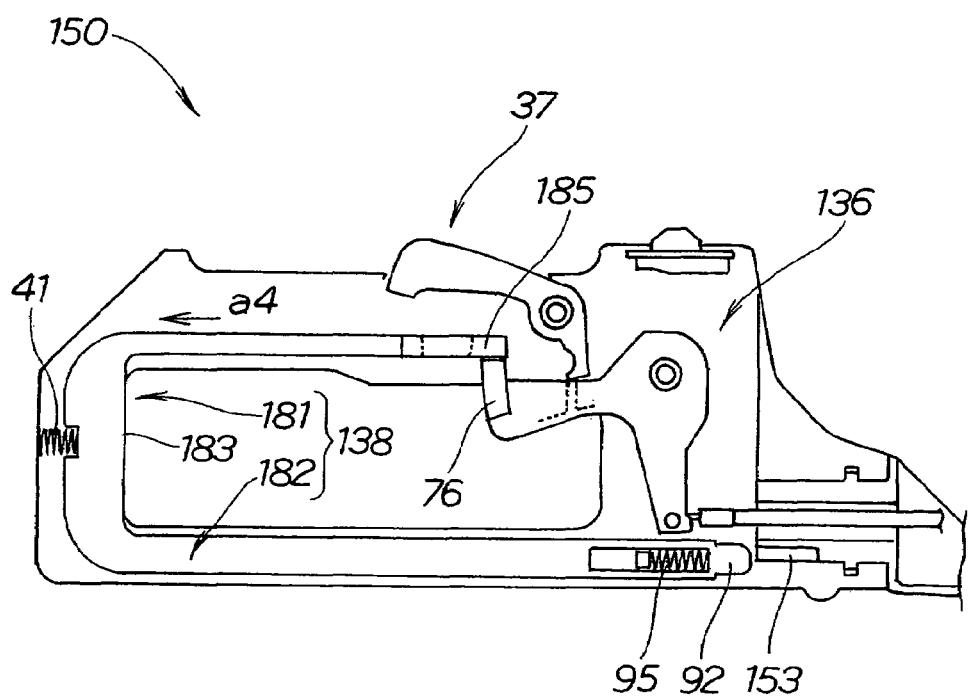

FIGS. 17A and 17B are views explanatory of how the throttle lever 136 and the operating handle 150 are operated in the power working machine 10.

As the throttle lever 136 is pulled upward by the human operator as depicted by arrow a3 in FIG. 17A, the actuator portion 78 of the throttle lock lever 37 is allowed to escape to the guide portion 75 of the throttle lever 136, so that the upper and lower trimming blades 13 and 14 can be actuated via the drive source 12 to perform desired trimming work.

The lever complex 138 (upper and lower lever sections 181 and 182) can be locked by the human operator operating the throttle lever 136 to fit the lock portion 76 of the throttle lever 136 into the fitting portion 184 of the upper lever section 181. In this way, the operating handle 150 can be reliably prevented from being rotated by the human operator during operation of the throttle lever 136.

As illustrated in FIG. 17B, by the human operator gripping together a rear portion of the operating handle 150 and the operation portion 183 of the upper lever section 181 when the throttle lever 136, throttle lock lever 37 and lever complex 138 are in their respective positions of FIG. 16A, the lever complex 138 can be pulled in the direction of arrow a4 with the return spring 95 and compression spring 41 compressed, so that the projection 92 is disengaged from the locking groove 153. Thus, rotating operation, by the human operator, of the handle 150 is now permitted, simultaneously with which the pivotal movement of the throttle lever 136 is disabled or inhibited with the lock portion 76 engaged by the stopper portion 185 of the upper lever section 181. As a consequence, the throttle lever 136 can be reliably prevented from being pivotally moved or operated during the rotating operation of the handle 150, which thereby prevents erroneous operation of the throttle lever 136.

As, in such conditions, the human operator rotates the operating handle 150 to cause the projection 92 to front a desired one of the locking grooves 153 and then releases the operation portion 183, the projection 92 can be fitted into and locked by the desired locking groove 153 by returning (resilient) action of the return spring 95 and compression spring 41.

The operating handle 150 can be set in various rotational positions in the same manner as illustrated in FIG. 10 in relation to the operating handle 15.

Whereas the embodiment of the power working machine has been described as driving both of the upper and lower trimming blades 13 and 14 as illustrated in FIG. 2, the present invention is not so limited. For example, the power working machine may be constructed to reciprocate only one of the upper and lower trimming blades 13 or 14 relative to the other 14 or 13.

Further, whereas, in the described embodiment, the upper and lower trimming blades 13 and 14 are each preferably in the form of a double-edged blade capable of trimming in leftward and rightward directions, the blades 13 and 14 may be single-edged blades capable of trimming in only one of the leftward and rightward directions.

Furthermore, in the described embodiment, the throttle-lever mounting boss 55 and throttle-lock-lever mounting boss 56 are formed on the left handle half 33 as seen in FIG. 4 or 12, but the present invention is not so limited. For example, the throttle-lever mounting boss 55 and throttle-lock-lever mounting boss 56 may be formed on the right handle half 34, or on both of the left and right handle halves.

Moreover, in the described embodiment, the upper lever section (operation lever) 81, 181 and lower lever section (lock mechanism) 82, 182 are formed integrally to provide the lever complex 38, 138, the present invention is not so limited. For example, the upper lever section (operation lever) 81, 181 and lower lever section (lock mechanism) 82, 182 may be formed separately and interconnected via one or pins or other suitable fastener means.

Obviously, various minor changes and modifications of the present invention are possible in the light of the above teaching. It is therefore to be understood that within the scope of the appended claims the invention may be practiced otherwise than as specifically described.

What is claimed is:

1. A power working machine comprising:
    a machine body having a front portion, a rear portion, and
        a shaft section extending from the rear portion;

a drive source mounted substantially centrally on the machine body;
trimming blades attached to the front portion of the machine body and drivable by the drive source;
an operating handle rotatably mounted on the shaft section and disposed on the rear portion of the machine body for gripping by a human operator;
a throttle lever mounted on the operating handle for pivotal movement between a non-operating position and an operating position for adiusting an output of the drive source; and
a throttle lock lever connected to the operating handle for disabling the pivotal movement of the throttle lever in a locking position of the throttle lock lever;
wherein the operating handle comprises a handle body having a front end portion connected to the rear portion of the machine body, a lock mechanism connected to the handle body for locking the operating handle at a desired rotational position relative to the machine body, and an operation lever having an operation portion projecting inwardly from a rear end portion of the handle body and operable by the human operator for unlocking the lock mechanism to thereby permit rotational movement of the operating handle and, simultaneously with the unlocking of the lock mechanism, for placing the throttle lock lever in the locking position thereof to disable the pivotal movement of the throttle lever.

2. A power working machine as claimed in claim 1; wherein the shaft section of the machine body has a plurality of locking grooves formed therein; and wherein the lock mechanism has a projection for engaging one of the locking grooves in the shaft section.

3. A power working machine as claimed in claim 1; wherein the lock mechanism and the operation lever are slidable in a frontandrear direction of the operating handle.

4. A power working machine as claimed in claim 3; wherein the lock mechanism and the operation lever are integrated into a single unitary structure.

5. A power working machine as claimed in claim 1; wherein the handle body comprises a pair of handle portions each having guide portions for slidably mounting thereon the lock mechanism and the operation lever.

6. A power working machine comprising:
a machine body having a front portion, a rear portion, and a shaft section extending from the rear portion;
a drive source mounted substantially centrally on the machine body;
trimming blades attached to the front portion of the machine body and drivable by the drive source;
an operating handle rotatably mounted on the shaft section and disposed on the rear portion of the machine body for gripping by a human operator;
a gripping handle separate and independent from the operating handle and disposed at the front portion of the machine body for gripping by the human operator, the gripping handle being generally in the shape of a closed loop;
a throttle lever disposed on a front portion of the operating handle for pivotal movement between a non-operating position and an operating position for adjusting an output of the drive source; and
a throttle lock lever disposed on the operating handle for disabling the pivotal movement of the throttle lever in a locking position of the throttle lock lever;
wherein the operating handle comprises a lock mechanism for locking the operating handle at a desired rotational position relative to the machine body, and an operation lever disposed at a rear portion of the operating handle for unlocking the lock mechanism to thereby permit rotational movement of the operating handle and,
simultaneously with the unlocking of the lock mechanism, for placing the throttle lock lever in the locking position thereof to disable the pivotal movement of the throttle lever.

7. A power working machine comprising:
a machine body having a front portion, a rear portion, and a shaft section extending from the rear portion;
a drive source mounted substantially centrally on the machine body;
trimming blades attached to the front portion of the machine body and drivable by the drive source;
an operating handle rotatably mounted on the shaft section and disposed on the rear portion of the machine body for gripping by a human operator;
a throttle lever disposed on a front portion of the operating handle for pivotal movement between a nonoperating position and an operating position for adjusting an output of the drive source; and
a throttle lock lever disposed on the operating handle for disabling the pivotal movement of the throttle lever in a locking position of the throttle lock lever;
wherein the operating handle comprises a lock mechanism for locking the operating handle at a desired rotational position relative to the machine body, and an operation lever disposed at a rear portion of the operating handle for unlocking the lock mechanism to thereby permit rotational movement of the operating handle and,
simultaneously with the unlocking of the lock mechanism, for placing the throttle lock lever in the locking position thereof to disable the pivotal movement of the throttle lever; and
wherein the throttle lock lever has a lock portion for permitting pivotal movement of the throttle lever while simultaneously locking the operation lever of the operating handle.

8. A power working machine according to claim 7; wherein the operating handle further comprises a handle body having a front end portion connected to the shaft section of the machine body, and a lever unit having the lock mechanism and the operation lever and connected to the handle body and slidable in a front-and-rear direction of the machine body for selectively locking the operating handle by the lock mechanism at a desired rotational position relative to the machine body and unlocking the operating handle by the operation lever to thereby permit rotational movement of the operating handle relative to the machine body.

9. A power working machine according to claim 8; wherein the operation lever has an operation portion projecting inwardly from a rear end portion of the handle body and operable by the human operator, a fitting portion for engagement with the a lock portion of the throttle lock lever, and a stopper portion for stopping movement of the throttle lock lever.

10. A power working machine according to claim 9; wherein the lock mechanism has a projection for engagement with one of a plurality of locking grooves of the shaft section, an arm portion extending from the projection toward the rear portion of the operating handle, a spring holding portion formed in the arm portion, and a spring disposed in the spring holding portion for biasing the lever unit toward the rear direction of the machine body.

11. A power working machine comprising:
a machine body having a front portion, a rear portion, and a shaft section extending from the rear portion;
a drive source mounted substantially centrally on the machine body;
trimming blades attached to a front portion of the machine body and drivable by the drive source;
an operating handle rotatably mounted on the shaft section and disposed on the rear portion of the machine body for gripping by a human operator, the operating handle being generally in the shape of a closed loop; and
a throttle lever mounted on the operating handle for pivotal movement between a nonoperating position and an operating position for adjusting an output of the drive source; and
wherein the operating handle comprises a handle body having a front end portion connected to the rear portion of the machine body, a lock mechanism disposed in the handle body for locking the operating handle at a desired rotational position relative to the machine body, and an operation lever having an operation portion projecting inwardly from a rear end portion of the handle body and operable by the human operator for unlocking the lock mechanism to thereby permit rotational movement of the operating handle and, simultaneously with the unlocking of the lock mechanism, for locking the throttle lever in the non-operating position.

12. A power working machine according to claim 11; wherein the operating handle has a front portion connected to the rear portion of the machine body and a rear portion; and wherein the throttle lever is disposed in the rear portion of the operating handle.

13. A power working machine according to claim 12; further comprising a gripping handle separate and independent from the operating handle and disposed at the front portion of the machine body for gripping by the human operator, the gripping handle being generally in the shape of a closed loop.

14. A power working machine according to claim 11; further comprising a gripping handle separate and independent from the operating handle and disposed at the front portion of the machine body for gripping by the human operator, the gripping handle being generally in the shape of a closed loop.

15. A power working machine according to claim 11; wherein the operating handle further comprises a lever unit having the lock mechanism and the operation lever, the lever unit being connected to the handle body and slidable in a front-and-rear direction of the machine body for selectively locking the operating handle by the lock mechanism at a desired rotational position relative to the machine body and unlocking the operating handle by the operation lever to thereby permit rotational movement of the operating handle relative to the machine body.

16. A power working machine according to claim 15; further comprising a throttle lock lever disposed on the operating handle for disabling the pivotal movement of the throttle lever in a locking position of the throttle lock lever; and wherein the operation lever has a fitting portion for engagement with a lock portion of the throttle lock lever, and a stopper portion for stopping movement of the throttle lock lever.

17. A power working machine according to claim 16; wherein the lock mechanism has a projection for engagement with one of a plurality of locking grooves of the shaft section, an arm portion extending from the projection toward the rear portion of the operating handle, a spring holding portion formed in the arm portion, and a spring disposed in the spring holding portion for biasing the lever unit toward the rear direction of the machine body.

\* \* \* \* \*